United States Patent Office 3,497,574
Patented Feb. 24, 1970

3,497,574
ADHESIVE COMPOSITIONS
Jack J. Press, 1218 E. Laurelton Parkway,
Teaneck, N.J. 07666
No Drawing. Continuation-in-part of application Ser. No. 113,972, Apr. 4, 1961. This application Feb. 16, 1965, Ser. No. 433,226
Int. Cl. C08f 29/12
U.S. Cl. 260—897                                    6 Claims The invention described herein may be manufactured and used by or for the Government of the United States of America for governmental purposes without the payment of any royalties thereon or therefor.

This application is a continuation-in-part of my copending application Ser. No. 113,972, filed Apr. 4, 1961 for improvements in Stereoregular Polyolefins, now abandoned.

The invention relates to olefinic compositions. More particularly, this invention relates to polymeric compositions having improved adhesive properties, said compositions containing a major amount of polyolefins.

A major deficiency encountered in the use of polyolefins is the inability to form a strong adhesive bond without difficulty to materials such as metals, glass, plastics, films, coatings and the like. This is particularly a problem with polyolefins of the stereoregular type due to their crystallinity and stiffness.

In the past, attempts have been made to improve adhesion between polyolefins and preformed structures such as films, fibers, and plastics by a great variety of pretreatments. These have included exposure to oxidation, sulfonation, acids, electric discharge, and aromatic solvents at high temperatures. However, these treatments are complicated and expensive, and may only be applied to a preformed structure.

A need exists for a simple and inexpensive means of increasing the adhesion of polyolefinic compositions so that they may be directly bonded to a wide variety of substrates without the need for special treatments.

I have discovered that a selected number of fusible, hydrophillic, polymers can be dispersed in the polyolefin to give a composition having improved adhesive properties. These polymers have been found to be insoluble in the stereoregular polyolefin but generally soluble or dispersible in water or an oxygenated solvent. It has been found that even at low levels of modification (1%), the polyolefinic composition can be directly processed to give a product having good adhesion. It has also been found that such products may be laminated, coated, and cemented with a wide variety of materials without special treatment.

It is believed that my selected hydrophillic amorphous polymers are not compatible with the crystalline portions of the polyolefin. As a result, when melt mixed together, the selected polymers concentrate as a continuous network in the amorphous portions of the polyolefin. The material at the surface of the structure may then function as local centers of adhesion, thereby enabling a very strong bond to be made to extraneous materials.

It is also possible that the modifier may form a continuous or intermittent molecular film between the substrate and the polyolefin, strongly bonding them together. This may happen when the polyolefinic composition of this invention is laminated, coated or cemented with such a substrate. In such a case, the film formed would be anchored at the adhesion centers developed in the surface of polyolefinic structure.

Included in this invention are olefinic structures having highly improved adhesive properties comprising a matrix of a polyolefin taken from the group consisting of—

(a) polyethylene
(b) polypropylene
(c) polybutene
(d) polymethylpentene
(e) polystyrene, said matrix having dispersed therein between 1 and 20% of a second, hydrophillic, non-soluble, fusible polymer selected from the group consisting of:

(1) Copolymer of 50 mole percent of ethylene 50 mole percent of maleic acid,
(2) Copolymer of 50 mole percent of ethylene and 50 mole percent of the partial ethyl ester of maleic acid,
(3) Copolymer of 50 mole percent ethylene and 50 mole percent of the partial amide of maleic acid,
(4) Copolymer of 50 mole percent of maleic acid and 50 mole percent of vinyl methyl ether,
(5) Copolymer of 50 mole percent of maleic anhydride and 50 mole percent of vinyl methyl ether,
(6) Copolymer of 50 mole percent of maleic anhydride and 50 mole percent of ethylene,
(7) Polyvinyl methyl ether, and
(8) Polyvinyl ethyl ether.

The following examples set forth typical polymers which may be used within the concept of this invention to modify a polyolefin in order to enhance its adhesion. Each is followed by results quite clearly illustrating the benefit achieved with such a combination.

EXAMPLE 1

Various percent additions of polyvinyl ethyl ether, as hereinafter indicated, were each uniformly mixed in a Banbury mixer for 10 minutes with polypropylene in the form of a powder.

The mixtures were then cooled with Dry Ice, ground, passed through a 50 mesh screen, and dried to remove moisture.

Each of the dried mixtures was then prepared in the form of a disc in the following manner. The powder of each sample was spread uniformly around a circular shouldered Pyrex glass disk with an inside diameter of 4 inches. The dishes were then covered by an inner nesting circular shouldered Pyrex glass dish with a bottom outer separation rib projecting downwardly about 0.05 inches. The assembly, weighted with a preheated 5 pound weight, was then placed in an oven at 250° C. to 300° C. for 6 to 15 minutes. Then the weight was removed and the assembly placed in a refrigerator at about 4° C. to cool. The assembly dishes were then separated to give a fused disc.

A blank disc was also prepared without the modifier.

Results

The blank disc was very easily separated from the glass dishes, but a disc prepared at a 2 percent level of addition of polyvinyl ethyl ether was only prepared from the dish with considerable difficulty and at the 5 and 10 percent level, the dish had to be broken to obtain the disc. These results indicate that the adhesion of the disc to glass is increased with increasing levels of addition of the modifiers to the polypropylene.

EXAMPLE 2

Discs were prepared utilizing polyvinyl ethyl ether in combination with polypropylene in the manner indicated in Example 1. In this case, however, a silicone rubber sheet was interposed between the parts of the dish and the plastic composition. The assembly dishes were then easily separated in each case to give a fused disc. A blank was also prepared consisting entirely of polypropylene.

A 2 inch length of a piece of scotch tape (1 inch in width and 4 inches in length) was placed on the surface of the disc and 10 pounds of pressure was applied for 10 minutes to the upper surface of the tape.

The free surface of the disc was then securely taped in an unmovable position to the bottom jaw of a tensile tester and the free end of the scotch tape was secured vertically to the upper jaw of the tester. The tensile force necessary to strip the film from the disc was then determined.

It was found that the blank only required a force of 1/10 of a pound to separate the film from the disc. The force required was increased to 1/4 of a pound when the propylene was modified with 2% of the selected polymer and with increasing levels of addition, the force required was increased to 3/4 of a pound and 2 pounds at a 5% and 10% level of addition of modifier to olefin.

EXAMPLE 3

In accordance with the procedure of Example 1, I prepared discs using, as modifiers, medium viscosity polyvinyl methyl ether (Lutonal M 40, Putnam Chemical Corp.) and low viscosity polyvinyl ethyl ether (Lutonal A 25, Putnam Chemical Corp.) dissolved in isopropanol. The solution was mixed with polypropylene powder and dried prior to forming the disc. The level of modification was 5%.

The adhesion of the fused disc to glass was very high and the glass dishes had to be smashed to obtain the discs.

EXAMPLE 4

In accordance with the procedure of Example 1, I prepared discs using, as modifiers, a medium viscosity copolymer of ethylene and maleic anhydride (Resin DX–840–21, Monsanto Chemical Corp.), alone, and in combination with equal mixtures of polyethylene glycol 4000, polyethylene glycol 200 monostearate, secondary dihydrogenated tallow amine and quaternary tri coconut methyl ammonium chloride, respectively.

The discs at a 5% by weight level of modification, all showed greatly increased adhesion to glass and could only be removed from the dishes after fusion by breaking or crushing the dishes. Aluminum dishes gave the same results.

EXAMPLE 5

Discs were prepared utilizing 5% by weight polyvinyl methyl ether in combination with linear polyethylene in the manner indicated in Example 1. In these cases, however, either a 0.005 inch thick cellophane sheet or a 0.10 inch thick aluminum sheet was interposed between the parts of the dish and the plastic composition. Blanks were also prepared consisting entirely of polyethylene (linear).

The fused discs, in the case of the blanks, and the cellophane and aluminum separated intact. However, the cellophane and aluminum was secured to the discs, in the case of the modified composition, and had to be torn and scrapped from the individual discs.

EXAMPLE 6

Discs were prepared in accordance with Example 5. However, in this case, the polyolefin consisted of conventional polyethylene. The cellophane and aluminum sheets were easily separated from the blank discs, however, in the case of the modified discs, the cellophane and aluminum had to be torn and scrapped from the discs.

EXAMPLE 7

In accordance with Example 2, discs were prepared and tested. In this case, however, linear polyethylene was utilized as the polyolefin and 5% polyvinyl methyl ether was utilized as modifier. It took 1/10 of a pound of force to separate the scotch tape from the blank disc and the modified disc required a 1 pound force to strip it of the tape.

EXAMPLE 8

In accordance with Example 7, discs were prepared utilizing 5% by weight of polyvinyl methyl ether in combination with conventional polyethylene. A blank of polyethylene was also prepared.

It required 1/8 of a pound of force to strip the blank disc of the Scotch tape, while the same action required 3/4 of a pound of force in the case of the modified disc.

EXAMPLE 9

Discs were prepared and tested in accordance with the procedure set forth in Example 2. The olefin in each of the separate discs was either polypropylene, linear polyethylene or conventional polyethylene. The polymers used to modify the polyolefin included:

(1) The half ethyl ester of a copolymer of 50 percent ethylene and 50 percent maleic anhydride copolymer.

(2) The half amide of a copolymer of 50 percent ethylene and 50 percent maleic anhydride copolymer.

(3) A copolymer of 50 percent vinyl methyl ether and 50 percent maleic acid.

(4) A copolymer of 50 percent vinyl methyl ether and 50 percent maleic anhydride.

(5) A copolymer of 50 percent ethylene and 50 percent maleic acid.

The force required in each case to strip the Scotch tape from each of the discs was as follows:

FORCE REQUIRED (POUNDS)

| Disc | PP [1] | Linear, Pet [2] | Conventional, Pet [2] |
| --- | --- | --- | --- |
| Blank | 1/10 | 1/10 | 1/8 |
| 1 | 1 1/2 | 1 1/4 | 1 |
| 2 | 1 1/2 | 1 | 1 |
| 3 | 1 1/4 | 1 1/4 | 3/4 |
| 4 | 1 | 1 | 1/2 |
| 5 | 1 | 1 | 1 |

[1] Polypropylene.
[2] Polyethylene.

EXAMPLE 10

In accordance with Example 2, discs were formed utilizing 5% by weight polyvinyl ethyl ether as modifier. After forming, each of the discs were laminated to other material (film, sheets, etc.) by pressing it to the material at 50 pounds per square inch pressure and temperature of 25° C. below the melting point of the polyolefin. After cooling, the laminated material was judged subjectively for ease of separation of the layers and the results were set forth below:

| | Ease of separation | |
| --- | --- | --- |
| Laminate | From blank | From disc |
| Cellophane | Easy | Very difficult. |
| Aluminum | do | Do. |
| Polyester | do | Moderately difficult. |
| Nylon | do | Do. |
| Glass | do | Very difficult. |

It appears as if my selected lower melting hydrophillic polymeric modifiers (m.w. 500 to 20,000), when dispersed in the polyolefin, have high mobility and readily concentrate to form a network in the amorphous areas. Thus, they are readily free and available to supply numerous free molecular chain ends or segments which are necessary for tack and adhesion.

Higher molecular weight modifiers (20,000 to 50,000) may be describable, where greater cohesion in bonding is necessary, or to reduce excessive tack or blocking of the film or fiber, at room temperature, while activating high tack and bonding at elevated temperatures. The latter conditions would be encountered in laminating, coating, pressing, printing and drying. These post adhesion processes are carried out at temperatures up to about 25° C. below the melting point of the polymeric structure.

My modifiers are particularly useful to modify the adhesion of stereoregular polyolefins, such as linear, isotactic, and syndiotactic.

In the case of the stereoregular polyolefins a high degree of crystallinity gives such materials reduced molecular mobility and tack, and inherently poor adhesion. My selected modifiers, which have limited compatibility with the polyolefin, surprisingly give increased effectiveness with stereoregular, high crystalline polyolefins because the modifier concentrates in the amorphous region.

My modifiers may be used at slightly increased levels of addition to impart improved adhesion to non-stereoregular polyolefins. These may be advantageously used to modify conventionally nonstereoregular polyethylene, polypropylene, polybutene, polymethylpentene, polymethylbutene and polystyrene. My modifiers may be incorporated in the polyolefin in the range of 1 to 20% of the weight of the overall composition. If less than 1% is utilized, significant improvement will not be achieved in adhesion. If an amount greater than 20% is added to the polyolefin, many of the physical properties of the final product will be adversely affected. These include loss of strength, and a lower resistance to repeated flexing.

Many alternate methods of combining my modifiers with polyolefins are readily available. They may be combined during formation of the polymeric modifier or during actual polymerization of the polyolefin, with or without melting. They may be added to freshly polymerized polyolefin, which is still in solution in a suitable solvent, in the powdered form, or as a solution in a compatible solvent, or merely as a dispersion. They may be added to the polyolefin during precipitation, washing, neutralizing or compounding of the freshly prepared polyolefin prior to drying. This may be accomplished by adding the modifier as a powder or as a solution which is a nonsolvent for the polyolefin.

The modifier may also be melt mixed during processing or blending of the polymer, prior to use in extrusion of fiber, film, coating or plastic. It may also be added, as a liquid, or powder to finely ground or micronized polyolefin polymers, and then melt dispersed in situ during the hot dip, spray coating, or spreading and heat coating operation. It may be incorporated in polyolefin solutions or emulsions, and then applied to surfaces with or without heating.

The combination of my modifier and the desired polyolefin may be laminated, or coated by extrusions and spray methods, to metals, glass, cellophane, polyester films, fabrics and papers. The preformed film or fiber may also be directly laminated, or cemented, to metals, glass, film, sheets, or rubber.

As for the modifier itself, it should contain between 5 and 50% by weight of a monomeric unit having free carboxyl or carboxyl forming groups. If less than 5% is present, the composition is not sufficiently hydrophillic or adhesive promoting. If greater than 50% is present, the composition is too hydrophillic, absorbs excessive moisture, and interferes with extrusion or melt coating. Also in such a case, the intramolecular forces are strong and the modifier is not flexible and mobile. For present purposes, between 5 to 25% has been found to be particularly advantageous.

If the modifier contains vinyl methyl or ethyl ether, these should be present in an amount between 25 and 100% by weight. If less than 25% is present, the composition is not sufficiently hydrophillic and the modifier is too soluble in the polyolefin.

Obviously, many modifications and variations of the present invention are possible in the light of the above teachings. It is therefore to be understood that within the scope of the appended claims, the invention may be practiced otherwise than as specifically described.

I claim:
1. A polymer composition having improved adhesion comprising:
   a matrix of stereoregular crystalline polyolefin taken from the group consisting essentially of
      polyethylene
      polypropylene
      polybutene
      polymethylbutene, and
      polymethylpentene
   said matrix having dispersed therein, an amorphous, hydrophilic fusible polymer that is non-soluble in the matrix and in an amount that is between about 2 and 10 percent by weight of said composition from the group consisting of:
      polyvinyl methyl ether,
      polyvinyl ethyl ether,
      copolymer of 50 mole percent ethylene and 50 mole percent maleic acid,
      copolymer of 50 mole percent of ethylene and 50 mole percent of the partial ethyl ester of maleic acid,
      copolymer of 50 mole percent of ethylene and 50 mole percent of the partial amide of maleic acid,
      copolymer of 50 mole percent of maleic acid and 50 mole percent of vinyl methyl ether,
      copolymer of 50 mole percent of maleic anhydride and 50 mole percent of vinyl methyl ether, and
      copolymer of 50 mole percent of maleic anhydride and 50 mole percent of ethylene.

2. The composition of claim 1, wherein said hydrophilic polymer is a copolymer of 50 mole percent maleic anhydride and 50 mole percent ethylene.

3. The composition of claim 1, wherein said hydrophilic polymer is a copolymer of 50 mole percent ethylene and 50 mole percent of the partial ethyl ester of maleic acid.

4. The composition of claim 1, wherein said hydrophilic polymer is a copolymer of 50 mole percent maleic anhydride and 50 mole percent vinyl methyl ether.

5. The composition of claim 1, wherein said hydrophilic polymer is polyvinyl ethyl ether.

6. A polymer composition having improved adhesion comprising:
   a matrix of stereoregular crystalline polypropylene having dispersed therein amorphous hydrophilic polyvinyl methyl ether that is non-soluble in the matrix, in an amount that is about 5 percent by weight of said composition.

References Cited

UNITED STATES PATENTS

| 3,371,077 | 2/1968 | Calfee | 260—91.1 |
| 2,984,342 | 5/1961 | Smith | 206—59 |
| 3,023,198 | 2/1962 | Nowlin et al. | 260—897 |
| 3,144,430 | 8/1964 | Schaffhausen | 260—897 |

FOREIGN PATENTS

| 542,140 | 1942 | Great Britain |

OTHER REFERENCES

Reppe, W.: "Progress in the Manufacture and Use of Vinyl Ethers," pp. 6–7.

Reppe, W.: "Progress in the Manufacture and Use of Vinyl Ethers," Office of Technical Services Dept. of Commerce, Washington, D.C., Report PB 40868-T, pp. 1–10.

SAMUEL H. BLECH, Primary Examiner

M. J. TULLY, Assistant Examiner

U.S. Cl. X.R.

161—203, 216, 227, 231, 250; 260—874, 896